United States Patent [11] 3,621,098

[72] Inventors Jeffrey W. H. Watthey;
 Karl J. Doebel, both of Ossining, N.Y.
[21] Appl. No. 862,092
[22] Filed Mar. 17, 1969
[45] Patented Nov. 16, 1971
[73] Assignee Geigy Chemical Corporation
 Ardsley, N.Y.
 Original application Nov. 7, 1967, Ser. No. 681,078, now Patent No. 3,484,443, dated Dec. 16, 1969. Divided and this application Mar. 17, 1969, Ser. No. 862,092

[54] HYPOTENSIVE METHODS AND COMPOSITIONS UTILIZING HEXAHYDROBENZO[b] QUINOLIZINES
 12 Claims, No Drawings
[52] U.S. Cl. .................................................. 424/258
[51] Int. Cl. ..................................................... A61k 27/00
[50] Field of Search ......................................... 424/258

[56] References Cited
 UNITED STATES PATENTS

| | | | |
|---|---|---|---|
| 3,271,396 | 9/1966 | Bernstein et al. | 260/257 |
| 3,336,320 | 8/1967 | Doebel et al. | 260/293 |
| 3,375,253 | 3/1968 | Fields et al. | 260/286 |
| 3,408,352 | 10/1968 | Hardtmann | 260/288 |

OTHER REFERENCES

Kupchan, J., Org. Chem., Vol. 31, pp. 1713– 16 (1966).

*Primary Examiner*—Jerome D. Goldberg
*Attorneys*— Karl F. Jorda, Bruce M. Collins and Martin J. Spellman, Jr.

ABSTRACT: A hypotensive effect is achieved through the use of hexahydrobenzo [b] quinolizines characterized by the presence of at least 2 hydroxy or 2 alkoxy groups in the 7, 8, 9 and 10 positions. Also disclosed are pharmaceutical compositions utilizing these compounds.

HYPOTENSIVE METHODS AND COMPOSITIONS UTILIZING HEXAHYDROBENZO[b]QUINOLIZINES

CROSS-REFERENCE

This is a divisional of Ser. No. 681,078 filed Nov. 7, 1967, now U.S. Pat. No. 3,484,443.

DETAILED DESCRIPTION

The present invention pertains to hyposensitive methods and compositions utilizing a compound which may be characterized by the following formula I:

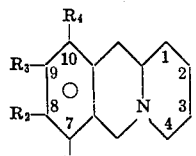

wherein:

$R_1$ is hydrogen, lower alkyl, hydroxy, lower alkyl or lower alkanoyloxy;

$R_2$ is hydrogen, hydroxy, lower alkoxy, or lower alkanoyloxy;

$R_3$ is hydrogen, hydroxy, lower alkoxy, or lower alkanoyloxy; and $R_4$ is hydrogen, hydroxy, lower alkoxy, or lower alkanoyloxy, with the proviso that if $R_1$ is hydrogen, $R_4$ must be hydroxy, lower aloxy or alkanoyloxy, and pharmaceutically acceptable acid addition salts thereof.

The term "pharmaceutically acceptable acid addition salts" when used herein and in the appended claims signifies those derived from organic and inorganic acids. Illustrative of the acids which form pharmaceutically acceptable addition salts with the instantly claimed compounds are, for example, hydrochloric, hydrobromic sulfuric, phosphoric, methanesulfonic, acetic, lactic, succinic, malic, aconitic, phthalic, tartaric, pamoic, and the like.

The compounds utilized in the methods and compositions of the present invention are prepared according to methods described in U.S. Pat. No. 3,484,443, the disclosure of which is hereby incorporated by reference.

The compounds utilized in the method and composition of the present invention, i.e. compounds of the above-described general formula and their physiologically tolerable acid addition salts possess valuable pharmacological and therapeutic properties and may be used in the form of pharmaceutical compositions, especially as cardiovascular, particularly hypotensive, and CNS active, particularly CNS stimulating and depressing agents. It is of special interest that the compounds having alkoxy groups in the unsaturated ring are particularly valuable hypotensive agents and especially those wherein $R_1$ is hydrogen, lower alkyl, or lower alkoxy, and $R_2$, $R_3$, and $R_4$ are hydrogen of lower alkoxy, at least two of $R_2$, $R_3$, $R_3$, and $R_4$, being adjacent lower alkoxy groups, with the proviso that if $R_1$ is hydrogen, $R_4$ is lower alkoxy.

The toxicity of the compounds of the instant invention is low; for instance, the $LD_{50}$ of 9,10-di-hydroxy-7-isopropyl-1,3,4,6,11,11a-hexahydrobenzo($b$) quinolizine hydrobromide administered orally to mice is approximately 250 mg./kg. In the case of 9,10-dihydroxy-7-methyl-1,3,4,6,11,11a-hexahydrobenzo ($b$) quinolizine hydrobromide, no deaths were observed when the substance was administered orally to mice at doses up to 1,250 mg./kg.

The cardiovascular activity was studied in the intact, anesthetized cat, as follows:

As indicated in the foregoing table, administration of the compounds of the invention causes a significant lowering blood pressure as shown under "response."

The compounds of the invention may be used in warm-blooded animals, particularly mammals, as medicaments in the form of pharmaceutical compositions containing the compounds in admixture or conjunction with a pharmaceutical organic or inorganic, solid or liquid carrier for oral, rectal, or parenteral administration. The total daily doses can vary from about 0.1 mg./kg., to about 10 mg./kg. preferably about 0.5 mg./kg., to 5 mg./kg.

The preferred route of administration is the oral route. Suitable compositions include, without limitation, tablets, capsules, powders, solutions, suspensions, sustained release formulations and the like.

To produce dosage units for peroral application, the compositions of this invention may be combined, e.g. with solid pharmaceutically acceptable pulverulent carriers such as lactose, saccharose, sorbitol, mannitol; starches such as potato starch, corn starch or amylopectin, also laminaria powder or citrus pulp powder, cellulose derivatives or gelatin, also lubricants such as magnesium or clacium stearate or polyethylene glycols (Carbowaxes) of suitable molecular weights may be added, to form tablets or press coated tablets. The latter are coated for example, with concentrated sugar solutions which can contain e.g. gum arabic, talcum and/or titanium dioxide, or they are coated with lacquer dissolved in easily volatile organic solvents or a mixture of organic solvents. Dyestuffs can be added to these coatings, for example, to distinguish between different contents of active substances.

Hard gelatin capsules contain, for example, granulates of the instant composition with solid pulverulent carriers such as e.g. lactose, saccharose, sorbitol, mannitol and further starches such as potato starch, corn starch or amylopectin, cellulose derivatives or gelatin, as well as magnesium stearate or stearic acid.

Suppositories containing a compound of the present invention are readily obtained by techniques well known to those skilled in the art of compounding dosage forms. A compound of the present invention is dispersed in a carrier such as cocoa butter and the suppositories formed in the usual way.

What is claimed is:

1. A pharmaceutical hypotensive composition comprising in dosage unit form a pharmaceutical carrier and a hypotensively effective amount of a compound selected from the group consisting of (a) a hydroxyhexghydrobenzo($b$) quinolizine of the formula:

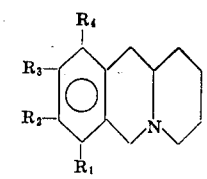

wherein $R_1$ is hydrogen, lower alkyl or hydroxy, and each of $R_2$, $R_3$ and $R_4$ is hydrogen or hydroxy, at least two of $R_1$, $R_2$, $R_3$ and $R_4$ being hydroxy, with the proviso that if $R_1$ is hydrogen, $R_4$ is hydroxy, (b) an alkoxyhexahydrobenzo($b$)quinolizine of the formula:

| Compound administered | Dose, mg./kg. | Route, intravenous or intra-duodenal | Blood pressure | | Duration of hypotension, minutes |
|---|---|---|---|---|---|
| | | | Control | Response (maximum) | |
| 8,9-dimethoxy 7-methyl-1,3,4,6,11,11a-hexahydrobenzo[b]quinolizine | 3 | I.V. | 100/48 | 75/33 | 20+ |
| 8,9,10-trimethoxy-1,3,4,6,11,11a-hexahydrobenzo[b]quinolizine | 3 | I.V. | 130/80 | 95/60 | 15+ |
| | 10 | I.V. | 125/80 | 70/55 | 17+ |
| 9,10-dimethoxy-7-isopropyl-1,3,4,6,11,11a-hexahydrobenzo[b]quinolizine | 30 | D.U. | 145/58 | [1] 110/38 | >90 |
| 7,10-dimethoxy-1,3,4,6,11,11a-hexahydrobenzo[b]quinolizine | 3 | I.V. | 115/65 | 80/45 | 0.6 |
| | 3 | I.V. | 150/70 | 100/55 | 1 |

[1] Blood pressure reading 90 minutes after administration of the substance.

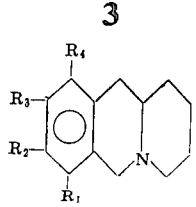

wherein $R_1$ is hydrogen, methyl or lower alkoxy; and
each of $R_2$, $R_3$ and $R_4$ is hydrogen or lower alkoxy, at least two of $R_1$, $R_2$, $R_3$ and $R_4$ being adjacent lower alkoxy with the proviso that if $R_1$ is hydrogen, $R_4$ is lower alkoxy, and (c) a pharmaceutically acceptable acid addition salt thereof.

2. A composition according to claim 1 wherein said compound is 8,9-dimethoxy-7-methyl-1,3,4,6,11,11a-hexahydrobenzo-(b)quinolizine.

3. A composition according to claim 1 wherein said compound is 8,9-dihyroxy-7-methyl-1,3,4,6,11,11a-hexahydrobenzo-(b) quinolizine.

4. A composition according to claim 1 wherein said compound is 7,8-dimethoxy-1,3,4,6,11,11a-hexahydrobenzo(b) quinolizine.

5. A composition according to claim 1 wherein said compound is 9,10-dihydroxy-7-methyl-1,3,4,6,11,11a-hexahydrobenzo(b) quinolizine.

6. A composition according to claim 1 wherein said compound is 7,8-dihydroxy-1,3,4,6,11,11a-hexahydrobenzo(b)-quinolizine.

7. A composition according to claim 1 wherein said compound is 8,9,10-trimethyoxy-1,3,4,6,11,11a-hexahydrobenzo(b)-quinolizine.

8. A composition according to claim 1 wherein said compound is 8,9,10-tirhydroxy-1,3,4,6,11,11a-hexahydrobenzo(b)-quinolizine.

9. A composition according to claim 1 wherein said compound is 9,10-dimethoxy-7-isopropyl-1,3,4,6,11,11a-hexahydrobenzo(b)quinolizine.

10. A composition according to claim 1 wherein said compound is 9,10-dihydroxy-7-isopropyl-1,3,4,6,11,11a-hexahydrobenzo(b) quinolizine.

11. A composition according to claim 1 wherein said compound is 7,10-dihydroxy-1,3,4,6,11,11 a-hexahydrobenzo(b)-quinolizine.

12. The method of producing a hypotensive effect in a mammal which comprises administering thereto a hypotensively effective amount of a compound selected from the group consisting of (a) a hydroxyhexahydrobenzo(b) quinolizine of the formula:

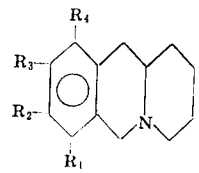

wherein $R_1$ is hydrogen, lower alkyl or hydroxy and
each of $R_2$, $R_3$ and $R_4$ is hydrogen or hydroxy, at least two of $R_1$, $R_2$, $R_3$ and $R_4$ being hydroxy, with the proviso that if $R_1$ is hydrogen, $R_4$ is hydroxy, (b) an alkoxyhexahydrobenzo(b) quinolizine of the formula:

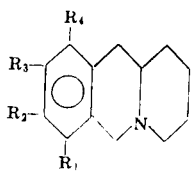

wherein $R_1$ is hydrogen, methyl or lower alkoxy; and
each of $R_2$, $R_3$ and $R_4$ is hydrogen or lower alkoxy, at least two of $R_1$, $R_2$, $R_3$, and $R_4$ being adjacent lower alkoxy with the proviso that if $R_1$ is hydrogen, $R_4$ is lower alkoxy, and (c) a pharmaceutically acceptable acid addition salt thereof.

* * * * *